United States Patent
Bowers et al.

(10) Patent No.: US 9,740,844 B1
(45) Date of Patent: Aug. 22, 2017

(54) WIRELESS WEARABLE AUTHENTICATORS USING ATTACHMENT TO CONFIRM USER POSSESSION

(71) Applicant: EMC IP Holding Company LLC, Hopkinton, MA (US)

(72) Inventors: Kevin D. Bowers, Melrose, MA (US); Ari Juels, Brookline, MA (US); Ronald Rivest, Arlington, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 102 days.

(21) Appl. No.: 14/139,973

(22) Filed: Dec. 24, 2013

(51) Int. Cl.
G06F 21/00 (2013.01)
G06F 21/35 (2013.01)

(52) U.S. Cl.
CPC .................... G06F 21/35 (2013.01)

(58) Field of Classification Search
CPC ................ G06F 21/31; H04L 63/08
USPC .............................................. 726/7
See application file for complete search history.

(56) References Cited

U.S. PATENT DOCUMENTS

| | | | |
|---|---|---|---|
| 6,695,207 B1* | 2/2004 | Norris, Jr. .............. | 235/382 |
| 2004/0172535 A1* | 9/2004 | Jakobsson et al. .......... | 713/168 |
| 2009/0268911 A1* | 10/2009 | Singh .......................... | 380/270 |
| 2014/0085050 A1* | 3/2014 | Luna .................. | G07C 9/00087 340/5.82 |
| 2015/0084774 A1* | 3/2015 | Wojcik .................. | A61B 5/082 340/573.1 |

OTHER PUBLICATIONS

Robertson et al. Continuous Transdermal Alcohol Monitoring, A Primer for Criminal Justice Professionals, Dec. 2007, ISBN:978-0-920071-60-1, pp. 1-30.
Ojala et al. Wearable Authentication Device for Transparent Login in Nomadic Applications Environment, 2008 International Conference on Signals, Circuits and Systems, pp. 1-6.
Hastad et al. Funkspiel Schemes: An Alternative to Conventional Tamper Resistance. In S. Jajodia, ed., Seventh ACM Conference on Computer and Communications Security, pp. 125-133. ACM Press. 2000.
Corner et al. Zero-Interaction Authentication, MOBICOM'02, Sep. 23-28, 2002, pp. 1-11.

(Continued)

Primary Examiner — Anthony Brown
(74) Attorney, Agent, or Firm — Ryan, Mason & Lewis, LLP

(57) ABSTRACT

Wireless wearable authenticators (WWAs) are provided using attachment to confirm user possession of the WWA. A user is authenticated by receiving authentication information from a wireless, wearable authentication (WWA) device of the user. The authentication information indicates whether the user has substantially continuously worn the WWA since a prior session where the user proved his or her identity to a relying device while wearing the WWA. The user is authenticated based on an evaluation of the authentication information. The authentication information comprises, for example, a credential κ and a current session label J. A value of the current session label J can provide the indication of whether the user has substantially continuously worn the WWA since a prior session where the user proved his or her identity to a relying device while wearing the WWA.

26 Claims, 2 Drawing Sheets

(56) References Cited

OTHER PUBLICATIONS

Figner et al. Using Skin Conductance in Judgment and Decision Making Research, in M. Schulte-Mecklenbeck, A. Kuehberger, & R. Ranyard (Eds.) A Handbook of Process Tracing Methods for Decision Research: A Critical Review and User's Guide (2010), pp. 163-184.
Halamka et al. The Security Implications of VeriChipTM Cloning, J Am Med Inform Assoc. Nov.-Dec. 2006; 13(6): 601-607.

* cited by examiner

WIRELESS WEARABLE AUTHENTICATORS USING ATTACHMENT TO CONFIRM USER POSSESSION

FIELD

The field relates generally to access control techniques, and more particularly, to authenticating one or more users using wearable computing devices.

BACKGROUND

In order to gain access to applications or other resources via a computer or another user device, users are often required to authenticate themselves by entering authentication information. Such authentication information may include, for example, passwords that are generated by a security token carried by a user. These passwords may be, for example, one-time passwords that are generated using a time-synchronous or event-based algorithm.

Sensor-equipped, wireless wearable computing devices are becoming increasingly popular consumer items. Examples of such wireless wearable computing devices include fitness-tracking devices, such as the Jawbone™ and Nike Fuel™ wristbands and the Fitbit™ clip-on device, augmented-reality headsets, such as Google Glass™, smartwatches and sensor-inlaid clothing. In many cases, users wear these devices continuously throughout the day. Some fitness trackers, for example, are waterproof and monitor sleep behavior, encouraging their use even while bathing and sleeping. Wireless, portable medical devices are also increasingly used and are generally carried by their users at all times, and may even be surgically implanted.

A number of authentication schemes have been proposed that employ wearable, wireless devices (or deploy special-purpose ones) for user authentication. For example, physical-access control using implanted RFID tags, gesture-based user authentication, and wireless "beacons" have been used to authenticate their users. Such devices are generically referred to as wearable, wireless authenticators (WWAs).

WW As can use any of a variety of cryptographic protocols to authenticate themselves to other, relying devices, such as mobile phones, laptops and electronically lockable doors. User authentication to a relying device using a WWA, however, also requires a secure binding between the user and the WWA. Typically, such binding is accomplished in one of two ways: (1) the user is presumed to retain physical possession of the wearable device, and possibly to deactivate the device should it be stolen; or (2) the user is at some point biometrically authenticated by the wearable device via, e.g., pulse or presentation of a fingerprint.

A need remains for improved techniques for establishing a binding between a user and his or her wearable, wireless, authentication device.

SUMMARY

One or more illustrative embodiments of the present invention provide wireless wearable authenticators (WWAs) using attachment to confirm user possession of the WWA. In accordance with an aspect of the invention, a method is provided for authenticating a user by receiving authentication information from a wireless, wearable authentication (WWA) device of the user. The authentication information indicates whether the user has substantially continuously worn the WWA since a prior session where the user proved his or her identity to a relying device while wearing the WWA. The user is authenticated based on an evaluation of the authentication information.

In one exemplary embodiment, the authentication information comprises a credential κ and a current session label J and wherein a value of the current session label J provides the indication of whether the user has substantially continuously worn the WWA since a prior session where the user proved his or her identity to a relying device while wearing the WWA. The credential κ comprises, for example, a shared secret key and/or a public key for the WWA. The current session label J comprises a counter and/or a randomly generated nonce. The WWA optionally adjusts the session label J if there is a break in continuity of attachment between the WWA and the user.

According to another aspect of the invention, whether the user has substantially continuously worn the WWA can be based on, for example, an evaluation of one or more of a sensorized catch on the WWA, wearable deformation of the WWA; pulse/bloodflow of the user; comparative biometric authentication of the user; optical movement detection; capacitive monitoring and electrical activity in skin of the user.

The techniques for establishing a binding between a user and his or her WWA device of the illustrative embodiments overcome one or more of the problems associated with the conventional techniques described previously, and verify user possession of the WWA, rather than assuming possession, and permit a user to authenticate seamlessly and continuously to a relying device. These and other features and advantages of the present invention will become more readily apparent from the accompanying drawings and the following detailed description.

DETAILED DESCRIPTION

Figure 1:
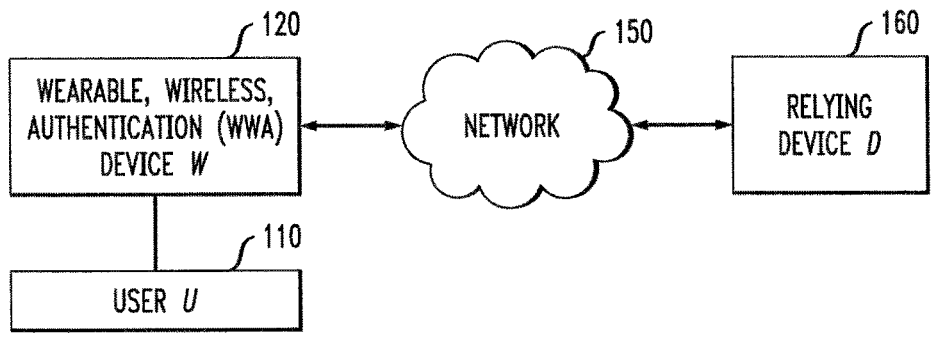
FIG. 1 is a diagram illustrating an exemplary network environment in which one or more embodiments of the present invention can operate.

One or more illustrative embodiments of the invention provide wireless wearable authenticators (WWAs) using attachment to confirm user possession of the WWA. WWAs often remain continuously with a user. A WWA can only authenticate a given user securely if their possession by that user is verified at the time of authentication. Thus, aspects of the present invention provide an approach to such verification that involves confirmation by the WWA to the relying device of the WWA's continuous attachment to a user.

Illustrative embodiments of the present invention will be described herein with reference to exemplary communication systems and associated processing devices. It is to be appreciated, however, that embodiments of the invention are not restricted to use with the particular illustrative system and device configurations shown. Accordingly, the term "communication system," as used herein, is intended to be broadly construed so as to encompass any type of system in which multiple processing devices can communicate with one another. Also, the term "processing device," as used herein, is intended to be construed broadly so as encompass any type of processing device, such as a computer, server, mobile telephone, radio-frequency identification (RFID) tag or reader, or an authentication token. Similarly, the term "authentication server" should be understood to encompass any type of processing device or set of such devices that is operative to authenticate a passcode or other authentication information. As used herein, an "authentication server" or "relying device" need not be a network-based server, and may be implemented as a portion of a device that performs other functions, as a combination of multiple servers or other devices, or in other forms.

Additionally, the term "authentication information," as used herein, is intended to include passwords, passcodes, answers to life questions, or other authentication credentials, or values derived from such authentication credentials, or more generally any other information that a user may be required to submit in order to obtain access to an access-controlled application or protected resource. Similarly, the term "passcode," as used herein, is intended to include authentication information such as one-time passcodes (OTPs), or more generally any other information that may be utilized for cryptographic authentication purposes.

Aspects of the present invention thus provide improved techniques for establishing a binding between a user and his or her WWA device. According to one aspect of the invention, the user proves his or her identity to a relying device, while wearing the WWA, using a bootstrapping session. On subsequent attempts by the user to authenticate using the WWA, the WWA confirms that the WWA has been continuously worn by the user since the bootstrapping session. The relying device, then, can conclude with high confidence that the user that is represented by the WWA is the same user that wore the WWA during the bootstrapping session.

Wireless bracelets used for home-arrest subjects and patients at risk of elopement from medical facilities typically beacon on a continuous basis and emit alerts when detached. An exemplary WWA incorporating aspects of the present invention, on the other hand, signals tampering by failing to attest to continuity since bootstrapping. Further aspects of the invention provide a protocol suitable for WWA use for authentication in unsupervised settings.

The disclosed bootstrapping approach has several benefits over previously proposed "something-you-have" and biometric schemes. The disclosed bootstrapping approach verifies user possession, rather than assuming possession, and permits a user to authenticate seamlessly and continuously to a relying device without the need for the WWA to authenticate the user biometrically. As a result, a WWA need not store and risk exposure of a biometric template for a user. Additionally, the disclosed scheme avoids the drawbacks of biometrics, such as high false-positive and false-negative rates, computationally intensive signal processing and social stigma.

WWA Protocol

The exemplary WWA protocol is presented in terms of three entities, a user U (110), a WWA W (120), and a relying device D (160). FIG. 1 illustrates an exemplary user U communicating with a relying device D over a network 150 via the WWA W. Typically, a relying device D is a computer or another system that includes one or more protected resources, that the user is attempting to access. For example, the relying device D may comprise a web server, a network server, a storage device or a smartphone connected to the WWA over Bluetooth. The protected resource may be, for example, an access-controlled application, web site or hardware device that the User U attempts to access over the network 150. In other words, a protected resource is a resource that grants user access responsive to an authentication process, as will be described in greater detail below.

As discussed hereinafter, the relying device D challenges the access request from the user U via the WWA W, and in response to the challenge, the WWA W provides the authentication information. The "continuously worn by user" certification from the WWA W allows the relying device D to determine whether to allow the user U to access the protected resource. The relying device D may communicate with one or more authentication servers (not shown) to verify the authentication information presented by the WWA W.

Although only a single user U (110) and associated WWA W (120) are shown in FIG. 1, it is expected that a practical implementation will support a substantially larger number of users U and associated WWAs W. Similarly, although only a single relying device D (160) is shown in FIG. 1, a system in accordance with the invention may include many such relying devices D. The invention is therefore not restricted to the particular number of client or relying devices.

Although particularly well-suited for use in applications in which roaming lightweight client devices authenticate themselves to relying devices, the present invention can be used for the secure authentication of any type of information processing device or service, including a device that is itself a server.

The user may also be referred to herein as a client. The term "user" should be understood to encompass either a client device, a person utilizing or otherwise associated with the device, or both. An operation described herein as being performed by a user may therefore be performed by a device, a person utilizing or otherwise associated with the device, or by both the user and the device. Similarly, a password associated with a device may be a password of a user of the device. In this case, the password may be temporarily associated with the device upon entry of the password into the device by the user, as in the case of a device that serves multiple users each having different passwords.

The relying device D (160) may be implemented as an otherwise conventional programming device or server programmed to perform the authentication functions described herein, or as other types of suitably-programmed information processing devices.

The network 150 may represent a global computer network such as the Internet, a wide area network (WAN), a local area network (LAN), a satellite network, a telephone or cable network, or various portions or combinations of these and other types of networks.

W registers a credential κ with D, where κ may be, e.g., a shared secret key or a public key for W. Additionally, W maintains a session label J, which may be, e.g., a counter or a randomly generated nonce.

Figure 2:
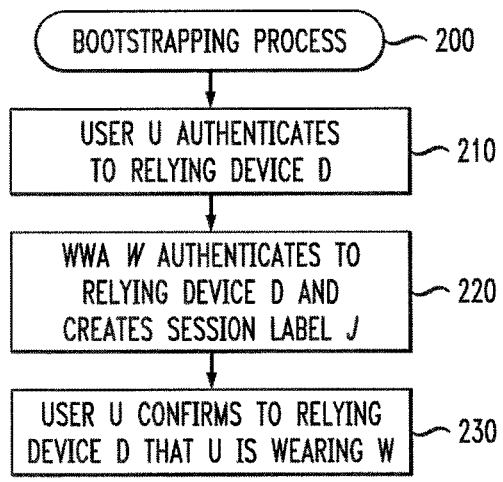
FIG. 2 is a flow chart illustrating an exemplary implementation of a bootstrapping process incorporating aspects of the present invention.

FIG. 2 is a flow chart illustrating an exemplary implementation of a bootstrapping process 200 incorporating aspects of the present invention. As shown in FIG. 2, the exemplary bootstrapping process 200 of the exemplary protocol is as follows:

(a) User U authenticates to relying device D during step 210, using any desired authentication mechanism.

(b) WWA W authenticates to relying device D during step 220 using credential κ. If κ is a pre-established credential shared by the two devices, then W may just authenticate to D using K. Otherwise, W and D perform a pairing protocol to establish κ freshly as a shared credential, in a known manner Additionally, W creates and asserts a fresh session label J.

(c) User U confirms to relying device D that U is wearing W during step 230, typically shortly after step 220.

Figure 3:
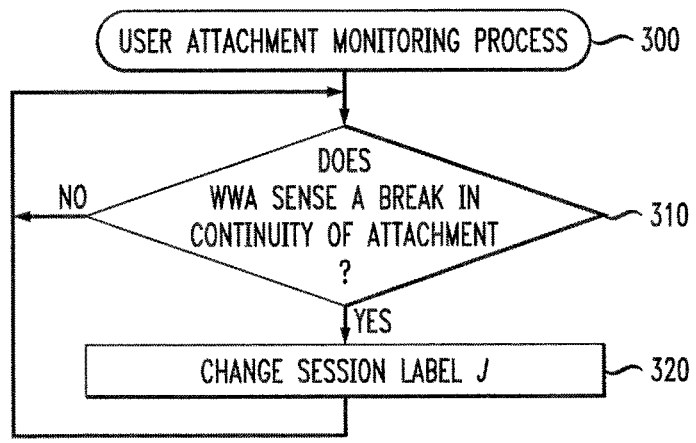
FIG. 3 is a flow chart illustrating an exemplary implementation of a user attachment monitoring process incorporating aspects of the present invention.

FIG. 3 is a flow chart illustrating an exemplary implementation of a user attachment monitoring process 300 incorporating aspects of the present invention. As shown in FIG. 3, the exemplary user attachment monitoring process 300 performs a test during step 310 to determine if, at any time, the WWA senses a break in continuity of attachment. If it is determined during step 310 that the WWA sensed a break in continuity of attachment, then the WWA changes session label J during step 320 (e.g., incrementing the session label J if J is a counter or re-randomizing or setting J to zero if J is a nonce). Program control then returns to step 310 to continue monitoring the attachment of the WWA to the user.

If, however, it is determined during step 310 that there was not a break in continuity of attachment, then program control returns to step 310 to continue monitoring the attachment of the WWA to the user.

Figure 4:
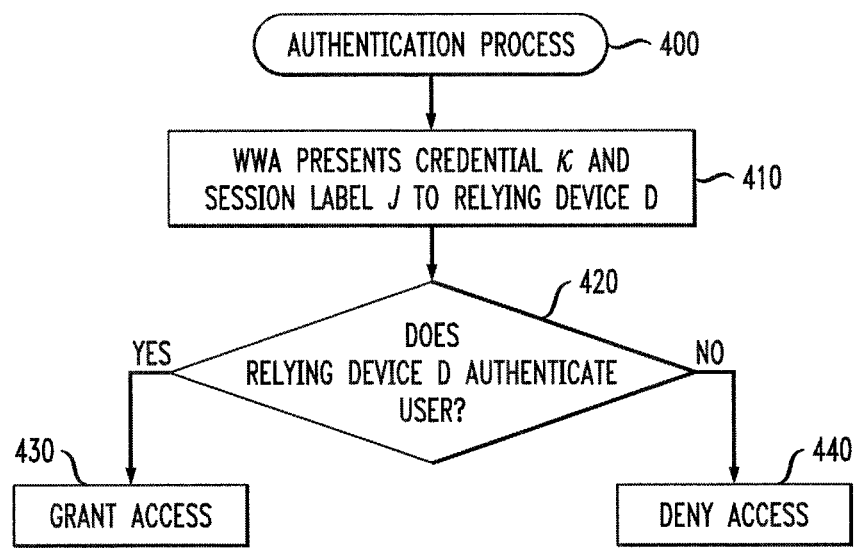
FIG. 4 is a flow chart illustrating an exemplary implementation of an authentication process incorporating aspects of the present invention.

FIG. 4 is a flow chart illustrating an exemplary implementation of an authentication process 400 incorporating aspects of the present invention. As shown in FIG. 4, the exemplary authentication process 400 is initiated when the WWA W presents credential κ and current session label J for authentication to the relying device D during step 410.

A test is performed during step 420 to determine if the relying device D authenticates the User U. For example, the relying device D may evaluate if a known key and corresponding session label J are received asserting that the known device has been in continuous contact with User U since bootstrapping. If it is determined during step 420 that the relying device D authenticates the User U, then the User U is granted access during step 430. If, however, it is determined during step 420 that the relying device D does not authenticate the User U, then the User U is denied access during step 440.

The exemplary authentication process 400 may be repeated arbitrarily many times until bootstrapping is again required.

There is a wide variety of design choices in the implementation of this general protocol. Any of its steps may involve explicit user action or may happen automatically, with no explicit user involvement.

EXAMPLE

Consider the use of a fitness wristband W communicating via Bluetooth with a relying device in the form of a mobile phone D. In this example, WWA W has the following characteristics: (1) W authenticates by means of a secret key κ; (2) W maintains a monotonically increasing counter J (initialized to 0); and (3) W is a wristband that is removed from the arm by means of a sensor-enabled catch.

In this example, W might be paired by U with D as a one-time setup operation. This pairing might occur simply by having U press a button on W and then confirm the presence of the wearable to the relying device D. The WWA W and relying device D (phone) then establish a shared symmetric key κ. (A security requirement with such a setup is that no adversary be present during this registration.)

The relying device D associates a locally stored counter value J' with W. When W and D are in close proximity, W automatically authenticates to D and asserts J. For example, W might use K to compute a Message-Authenticate Code (MAC) on a challenge issued by D and on J. If J=J', and D recognizes that bootstrapping has already taken place for the current value of J, then D regards user U as successfully authenticated via W.

Otherwise, J'<J. It is noted that J'>J signals an error condition in the exemplary embodiment. If the bracelet's catch is closed, then, bootstrapping takes place. The mobile phone D prompts the user to authenticate (e.g., enter a PIN), and then prompts the user to confirm that she is wearing her fitness bracelet W. For example, D might show W a picture of her bracelet and prompt her to to press a "Confirm" or "Deny" button. If the user confirms that she is wearing W, then bootstrapping is successful, and D sets J'←J.

Disambiguating WWA

In general, as a user may have several WWAs registered with a given relying device D, it is helpful (and more secure) to ensure that the user can disambiguate W. Any of a number of techniques can serve this purpose, e.g.:

Simple Picture/Icon: D might display for the user a picture or icon representing W. If the user has registered multiple devices of close or identical appearance, then D may need to disambiguate using one of the techniques below.

Naming: D might display or read out the model number or other distinctive name for W.

Synchronized Signaling: D and W may flash or emit sounds in synchrony.

Gesturing: D may instruct the user to gesture in a way detectable by W, e.g., shake W's arm. If the user is holding D, then D and W can verify that they are being moved simultaneously by the same user. Alternatively, with sufficiently sensitive motion sensors in D and W, it may be possible to determine that the two are in proximity with no explicit action on the part of the user.

Nearby-Signal Confirmation: W may emit a sound (potentially in the ultrasonic range) or flash a light to enable D to detect its close presence, on the presumption that such presence indicates that W is worn by the user (e.g., is on the arm of the user holding D). Note that in this case, no explicit action is required of the user for confirmation.

Physical Presentation: The user may explicitly bring W in close proximity to D. For example, if D and W have Near Field Communication (NFC) interfaces, the user might bring these interfaces together. Alternatively, the user might present a visual mark on W to a camera embedded in D or facilitate nearby-signal confirmation by moving W in proximity to D.

User Confirmation

In some schemes for disambiguating the WWA during bootstrapping, such as the last three listed above, the user implicitly confirms for D that the user is wearing W. In some cases, though, the user may need to provide such confirmation explicitly. The user can do this in any of several ways, such as pressing a confirmation button on D's screen or signaling confirmation by voice.

User confirmation, either implicit or explicit, can, if desired for greater security, accompany the authentication process 400 (FIG. 4), and not just the bootstrapping process 200 (FIG. 2) of the disclosed protocol.

Testing Post-Bootstrapping Continuity

As previously indicated, the exemplary user attachment monitoring process 300 (FIG. 3) detects any break in continuity of attachment between the user U and the WWA W. Post-bootstrapping continuity may be established by the WWA in any of a number of ways, including:

Sensorized Catch: The WWA may include an embedded detector of any form of manipulation required for physical removal of the WWA. For example, a WWA bracelet may have a sensor-equipped catch that is opened for removal. Releasing the catch, then, would invalidate continuity. (To ensure against a loose bracelet being slipped off, the bracelet may also permit size adjustment; enlargement, then, would also invalidate continuity.)

Wearable Deformation: A wearable device, such as a bracelet without a catch, may invalidate continuity if it detects a high degree of deformation, consistent with an attempt at removal.

Pulse/Bloodflow: The WWA may invalidate continuity if it fails to detect a pulse or bloodflow for a predetermined period of time or a pulse for some period of time subsequent to the last detected heartbeat.

Comparative Biometric Authentication: Existing schemes of biometric authentication in WWAs typically register a one-time biometric template T for a user and verify the continued presence of the user with respect to the template. A WWA can instead register a (potentially anonymous) template T upon bootstrapping.

Optical Movement Detection: Devices such as optical mice detect the distance they traverse across a surface. A similar mechanism can serve to detect removal of a device, such as a bracelet.

Capacitive Monitoring: A capacitive sensor may be built into the WWA to detect removal of the WWA from proximity to the wearer's skin.

Electrical Activity: Similar to an EKG, a WWA may detect electric signals in the skin. These signals may be detectable by a single WWA to test for connection, or may be measured between two WWAs. If multiple WWAs are employed, the WWAs may communicate with each other through skin transmissions to measure continuous connection to the other WWA through the person.

A WWA in accordance with the invention can replace any of a variety of authentication factors. For example, a WWA can replace the PIN used to unlock a mobile device or used in conjunction with a software authentication token (e.g., RSA SoftID). A WWA can also serve as a standalone authenticator. The WWA can also be used for physical access control, e.g., to unlock doors, or as a replacement for tamperproof bracelets in event admission. The ability of a WWA to perform continuous authentication is particularly appealing, as would be apparent to a person of ordinary skill in the art. For example, a WWA can serve as a seamless second factor in transactions performed by a user with a relying device D.

Variants and Enhancements

There are several variants on and enhancements to the basic WWA protocol described herein:

Situational Continuity Detection: Continuity detection can be conditioned on the user's environment. For example, in a home environment, malicious removal might be regarded as a low-probability event, and the WWA can be rendered relatively insensitive to potential continuity invalidation. In an unfamiliar environment, such sensitivity might be increased. In general, any of the steps of the disclosed protocol can proceed in a contextually aware manner.

Privacy Enhancement: As W is a wireless device, it is desirable to ensure that an eavesdropper or even an active adversary cannot identify W over the air. If W and D share a secret (such as κ), then indistinguishability under (adaptive or non-adaptive) chosen ciphertext attack (IND-CCA)-secure encryption of the channel between the two devices can, in general, provide this property. If W authenticates automatically, i.e., beacons its presence, then the WWA emission times should be randomized, rather than periodic. Otherwise, W can potentially be identified via a timing side-channel Physiological Monitoring: A WWA can enhance its assertion of post-bootstrapping continuity with other indications of environmental state. For example, a WWA can potentially detect physiological signs of duress in a user, immoderate consumption of alcohol, physical trauma, and other conditions suggesting user impairment. See, e.g., Bernd Figner and Ryan O Murphy, "Using Skin Conductance in Judgment and Decision Making Research," A Handbook of Process Tracing Methods for Decision Research: A Critical Review and Users Guide, 163-84 (2010); R. Robertson et al., "Continuous Transdermal Alcohol Monitoring: A Primer for Criminal Justice Professionals," Technical Report, Traffic Injury Research Foundation, December 2007; and J. Kent, "Malaysia Car Thieves Steal Finger," BBC News, 31 (March 2005), respectively, each incorporated by reference herein.

Silent Alarms: WWA state transmission may be combined with a silent alarm or funkspiel scheme such that the relying device can evaluate a continuity attestation, but an adversary that compromises W, cannot. See, e.g, Johan Hastad et al., "Funkspiel Schemes: an Alternative to Conventional Tamper Resistance," CCS '00: Proceedings of the 7th ACM conference on Computer and Communications Security, 125-133, New York, N.Y., USA, 2000, incorporated by reference herein.

Figure 5:
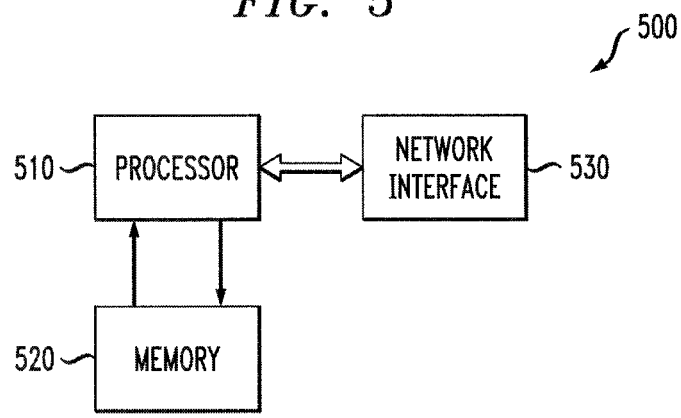
FIG. 5 illustrates one possible implementation of a processing device of the exemplary network environment of FIG. 1.

FIG. 5 illustrates one possible implementation of a given user device, WWA device, relying device, protected resource or another processing device of the example network environment of FIG. 1. The processing device 500 in this implementation includes a processor 510 coupled to a memory 520 and a network interface 530. These device elements may be implemented in whole or in part as a conventional microprocessor, digital signal processor, application-specific integrated circuit (ASIC) or other type of circuitry, as well as portions or combinations of such circuitry elements.

As will be appreciated by those skilled in the art, portions of an authentication technique in accordance with an embodiment of the invention can be implemented at least in part in the form of one or more software programs that are stored in memory 520 and executed by the corresponding processor 510. The memory 520 is also used for storing information used to perform computations or other operations associated with the disclosed authentication on techniques.

In one exemplary embodiment, aspects of the invention can be implemented as an article of manufacture comprising a processor-readable recordable storage medium having processor-readable instructions tangibly embodied thereon which, when implemented, cause a processor to carry out the steps of one or more aspects of the invention.

It should again be emphasized that the above-described embodiments of the present invention are presented for purposes of illustration only. Many variations and other alternative embodiments may be used. By way of example, the techniques are applicable to a wide variety of other types of communication systems and cryptographic devices that can benefit from challenge-response stored-passcode authenticated tokens. Accordingly, the particular illustrative configurations of system and device elements detailed herein can be varied in other embodiments. These and numerous additional alternative embodiments within the scope of the appended claims will be readily apparent to those skilled in the art.

What is claimed is:

1. A method performed by a relying device for authentication of a user, comprising:
receiving, by at least one processing device of said relying device, authentication information from a wireless, wearable authentication (WWA) device of said user, wherein said authentication information indicates whether said user has substantially continuously worn said WWA since a prior session where an identity of said user has been established to said relying device while wearing said WWA; and
authenticating, by at least one processing device of said relying device, said user based on an evaluation of said authentication information indicating whether said user has substantially continuously worn said WWA since said prior session where said identity of said user has been established to said relying device while wearing said WWA, wherein said authenticating comprises said relying device making an authentication determination and wherein said relying device is distinct from said WWA.

2. The method of claim 1, wherein the authentication information comprises a credential and a current session label and wherein a value of said current session label provides said indication of whether said user has substantially continuously worn said WWA since said prior session where said user proved his or her identity to said relying device while wearing said WWA.

3. The method of claim 2, wherein the current session label comprises one or more of a counter and a randomly generated nonce.

4. The method of claim 2, further comprising the step of said WWA adjusting said current session label if there is a break in continuity of attachment between said WWA and said user.

5. The method of claim 1, further comprising the step of disambiguating said WWA from among a plurality of WWAs said user registered with said relying device.

6. The method of claim 5, wherein the step of disambiguating said WWA comprises one or more of selecting a picture, icon or name representing said WWA; said WWA and said relying device employing synchronized signaling; said user gesturing in a manner detectable by said WWA; said WWA emitting a sound or flashing a light to enable said relying device to detect its presence; and said user bringing said WWA in close proximity to said relying device.

7. The method of claim 1, wherein an evaluation of whether said user has substantially continuously worn said WWA comprises an evaluation of one or more of a sensorized catch on said WWA, wearable deformation of said WWA; pulse/bloodflow of said user; comparative biometric authentication of said user; optical movement detection; capacitive monitoring and electrical activity in skin of said user.

8. The method of claim 1, wherein an evaluation of whether said user has substantially continuously worn said WWA is a function of a current environment of said user.

9. The method of claim 1, wherein transmission times of said WWA are randomized.

10. The method of claim 1, wherein said WWA is further configured to perform physiological monitoring of said user.

11. The method of claim 1, wherein said WWA is further configured to employ a funkspiel scheme for communications to said relying device.

12. An article of manufacture comprising a non-transitory processor-readable recordable storage medium having processor-readable instructions tangibly embodied thereon which, when implemented, cause a processor to carry out the following steps:
receiving, by at least one processing device of a relying device, authentication information from a wireless, wearable authentication (WWA) device of a user, wherein said authentication information indicates whether said user has substantially continuously worn said WWA since a prior session where an identity of said user has been established to said relying device while wearing said WWA; and
authenticating, by at least one processing device of said relying device, said user based on an evaluation of said authentication information indicating whether said user has substantially continuously worn said WWA since said prior session where said identity of said user has been established to said relying device while wearing said WWA, wherein said authenticating comprises said relying device making an authentication determination and wherein said relying device is distinct from said WWA.

13. An apparatus, comprising:
a memory; and
at least one hardware device coupled to the memory and operative to:
receive, by at least one processing device of a relying device, authentication information from a wireless, wearable authentication (WWA) device of a user, wherein said authentication information indicates whether said user has substantially continuously worn said WWA since a prior session where an identity of said user has been established to said relying device while wearing said WWA; and
authenticate, by at least one processing device of said relying device, said user based on an evaluation of said authentication information indicating whether said user has substantially continuously worn said WWA since said prior session where said identity of said user has been established to said relying device while wearing said WWA, wherein said authenticating comprises said relying device making an authentication determination and wherein said relying device is distinct from said WWA.

14. The apparatus of claim 13, wherein the authentication information comprises a credential and a current session label and wherein a value of said current session label provides said indication of whether said user has substantially continuously worn said WWA since said prior session where said user proved his or her identity to said relying device while wearing said WWA.

15. The apparatus of claim 14, wherein the credential comprises one or more of a shared secret key and a public key for said WWA.

16. The apparatus of claim 14, wherein the current session label comprises one or more of a counter and a randomly generated nonce.

17. The apparatus of claim 14, wherein said WWA is further configured to adjust said session label if there is a break in continuity of attachment between said WWA and said user.

18. The apparatus of claim 13, wherein said at least one hardware device is further configured to disambiguate said WWA from among a plurality of WWAs said user registered with said relying device.

19. The apparatus of claim 13, wherein an evaluation of whether said user has substantially continuously worn said WWA comprises an evaluation of one or more of a sensorized catch on said WWA, wearable deformation of said WWA; pulse/bloodflow of said user; comparative biometric authentication of said user; optical movement detection; distance traversed by an optical mouse across a surface; capacitive monitoring and electrical activity in skin of said user.

20. The apparatus of claim 13, wherein an evaluation of whether said user has substantially continuously worn said WWA is a function of a current environment of said user.

21. The apparatus of claim 13, wherein transmission times of said WWA are randomized.

22. The apparatus of claim 13, wherein said WWA is further configured to perform physiological monitoring of said user.

23. The apparatus of claim 13, wherein said WWA is further configured to employ a funkspiel scheme for communications to said relying device.

24. The method of claim 1, wherein said authentication is further based on at least one additional item of authentication information.

25. The apparatus of claim 13, wherein said authentication is further based on at least one additional item of authentication information.

26. The method of claim 1, wherein the authentication information comprises a credential and wherein the credential comprises one or more of a shared secret key and a public key for said WWA.

* * * * *